US009340269B2

(12) United States Patent
Argento et al.

(10) Patent No.: US 9,340,269 B2
(45) Date of Patent: May 17, 2016

(54) VISCOELASTIC DAMPENER

(71) Applicant: THE REGENTS OF THE UNIVERSITY OF MICHIGAN, Ann Arbor, MI (US)

(72) Inventors: Alan Argento, Chelsea, MI (US); Wonsuk Kim, Ann Arbor, MI (US); Neil Nodelman, Springdale, AR (US); Louis Carlisle Glover, IV, Springdale, AR (US)

(73) Assignee: The Regents Of The University of Michigan, Ann Arbor, MI (US)

( * ) Notice: Subject to any disclaimer, the term of this patent is extended or adjusted under 35 U.S.C. 154(b) by 26 days.

(21) Appl. No.: 14/278,260

(22) Filed: May 15, 2014

(65) Prior Publication Data

US 2014/0342841 A1 Nov. 20, 2014

Related U.S. Application Data

(60) Provisional application No. 61/824,000, filed on May 16, 2013.

(51) Int. Cl.
*F16C 3/02* (2006.01)
*F16F 15/10* (2006.01)
(Continued)

(52) U.S. Cl.
CPC ............ *B63H 23/36* (2013.01); *B63B 17/0081* (2013.01); *B64D 35/00* (2013.01); *F16C 3/023* (2013.01); *F16F 15/10* (2013.01); *Y10T 464/50* (2015.01)

(58) Field of Classification Search
CPC ...... B61D 39/04; B61D 39/046; B61D 53/88; B63B 17/0081; B63H 23/36; B64D 35/00; F16C 3/00; F16C 3/02; F16C 3/023; F16F 15/10; F16F 15/12; F16F 15/32; F16F 15/322; F16F 15/34
USPC .................................................... 464/127, 180
See application file for complete search history.

(56) References Cited

U.S. PATENT DOCUMENTS 2,001,166 A * 5/1935 Swennes ........................ 464/180
3,075,406 A * 1/1963 Butler, Jr. et al. ............. 464/180
(Continued)

FOREIGN PATENT DOCUMENTS

JP 62-056612 A 3/1987
JP 01-112046 A 4/1989
(Continued)

OTHER PUBLICATIONS

"How silicone release agents work." Dow Corning. Aug. 9, 2011, [online], [retrieved on Jul. 31, 2015] Retrieved from the Internet <URL: https://web.archive.org/web/20110908184550/http://www.dowcorning.com/content/discover/discoverchem/si-release.aspx>.*
(Continued)

*Primary Examiner* — Josh Skroupa
(74) *Attorney, Agent, or Firm* — Harness, Dickey & Pierce, PLC (57) ABSTRACT

A propeller shaft assembly having a propeller shaft member defining an inner volume. A foam liner member is disposed in at least a portion of the inner volume of the propeller shaft member. The foam liner member is made of a viscoelastic, natural oil polyol-based foam, whereby the foam liner member is operable to reduce vibration amplitudes occurring within the propeller shaft member relative to an undampened propeller shaft member.

14 Claims, 6 Drawing Sheets

(51) Int. Cl.
*B63H 23/36* (2006.01)
*B63B 17/00* (2006.01)
*B64D 35/00* (2006.01)

(56) References Cited

U.S. PATENT DOCUMENTS

| | | | | |
|---|---|---|---|---|
| 3,659,434 | A | * 5/1972 | Wolfe | 464/180 |
| 5,976,021 | A | * 11/1999 | Stark et al. | 464/180 |
| 6,234,911 | B1 | * 5/2001 | Breese et al. | 464/183 |
| 6,752,722 | B2 | * 6/2004 | Armitage et al. | 464/180 |
| 7,134,964 | B2 | * 11/2006 | Dine et al. | 464/180 |
| 7,893,287 | B2 | 2/2011 | Casper et al. | |
| 8,426,482 | B2 | 4/2013 | Frericks et al. | |
| 2002/0170752 | A1 | 11/2002 | Saitta et al. | |
| 2010/0048754 | A1 | 2/2010 | Abraham et al. | |

FOREIGN PATENT DOCUMENTS

| | | |
|---|---|---|
| JP | 01-283427 A | 11/1989 |
| JP | 08-068417 A | 3/1996 |

OTHER PUBLICATIONS

International Search Report and Written Opinion in Corresponding PCT International Patent Application No. PCT/US2014/038332 dated Oct. 10, 2014.

\* cited by examiner

Without Damper  *Fig-6A*

With Cardboard Liner System  *Fig-6B*

VISCOELASTIC DAMPENER

CROSS-REFERENCE TO RELATED APPLICATIONS

This application claims the benefit of U.S. Provisional Application No. 61/824,000, filed on May 16, 2013. The entire disclosure of the above application is incorporated herein by reference.

FIELD

The present disclosure relates to rotating members and, more particularly, relates to rotating circular, cylindrical tubular members, such as propeller shafts and drive shafts, having a viscoelastic, natural oil polyol-based foam dampener disposed within the rotating tubular member.

BACKGROUND

This section provides background information related to the present disclosure which is not necessarily prior art.

Rotating tubular shafts or members are often used in various applications to transmit torque between members. For example, rotating tubular shafts can be used to transmit torque in automotive vehicle application via a drive shaft. Similarly, rotating tubular shafts can also be used to transmit torque in aeronautical or marine applications via a propeller shaft. Generally, in all applications, these rotating tubular shafts or members can be referred to as propeller shafts.

In many of the aforementioned applications, however, the rotation and vibration of these tubular members can lead to undesirable noise, vibration, and/or harshness (NVH). The mechanism driving the shaft, such as a transmission/engine system can also generate noise and vibration which is carried, channeled and emanated by the propeller shaft. In both cases, the resulting NVH can then lead to unwanted discomfort by the vehicle occupants and potential damage due to vibrations.

Particularly in automotive applications, attempts have been made to damp such NVH through the use of liners or other members within the propeller shaft. Although such dampeners have performed reasonably well in absorbing propeller shaft vibrations, it has been found that they can have performance variations. It has also been found that conventional liners such as cardboard liner, although capable of performing some damping, may not provide sufficient damping required in today's applications.

Additionally and previously unrelated to damping of propeller shafts, there has been a recent need to reduce the overall weight of vehicles for improved fuel economy. To this end, it is particularly important to reduce the weight of rotating members because reduction of rotational mass is capable of providing additional efficiency benefits beyond that of simple weight reduction.

Accordingly, there is a need in the relevant art to provide a dampener for use in propeller shaft technology and other rotating tubular members that is capable of reducing noise, vibration, and harshness. Additionally, there is a need in the relevant art to provide a dampener for use in propeller shaft technology that is capable of reducing the mass of the propeller shaft. Still further, there exists a need in the relevant art to provide a dampener for use in propeller shaft technology that is capable of overcoming the deficiencies of conventional liners to provide improved reductions in noise, vibration, harshness, and weight.

SUMMARY

This section provides a general summary of the disclosure, and is not a comprehensive disclosure of its full scope or all of its features.

According to the principles of the present teachings, a propeller shaft assembly having an advantageous construction is provided. The propeller shaft assembly includes a propeller shaft member defining an inner volume. A foam liner member is disposed in at least a portion of the inner volume of the propeller shaft member. The foam liner member is made of a viscoelastic, natural oil polyol-based foam, whereby the foam liner member is operable to reduce vibration amplitudes occurring within the propeller shaft member relative to an undampened propeller shaft member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 8C and 8D are the sound intensity emanating from each system as a function of frequency.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to the principles of the present teachings, a viscoelastic, soy-based foam dampener is provided for use with a propeller shaft. More particularly, the present teachings relate to viscoelastic, soy-based foam dampeners for use in propeller shaft technology and other rotating tubular members that are capable of reducing noise, vibration, and harshness. Additionally, the present teachings relate to viscoelastic, soy-based foam dampeners for use in propeller shaft technology that are capable of reducing the rotating mass of the propeller shaft. Still further, the present teachings relate to viscoelastic, soy-based foam dampeners for use in propeller shaft technology that are capable of overcoming the deficiencies of conventional liners to provide improved reductions in noise, vibration, harshness, and weight.

It should be noted that although the present teachings specifically recite the use of a viscoelastic, soy-based foam, in some embodiments the foam can comprise a natural oil polyol (NOP) based foam, such as vegetable oil-based foam or palm oil-based foam. Therefore, the present discussion will describe in detail the use of a soy-based foam; however, NOP-based foams (or specifically vegetable oil-based foams or palm oil-based foams) are interchangeable therewith, unless specifically claimed otherwise.

Figure 1:
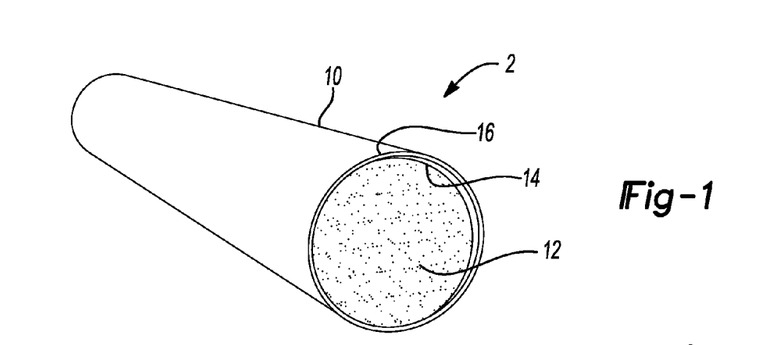
FIG. 1 is a schematic perspective view illustrating a propeller shaft assembly according to the principles of the present teachings.
Figure 2:
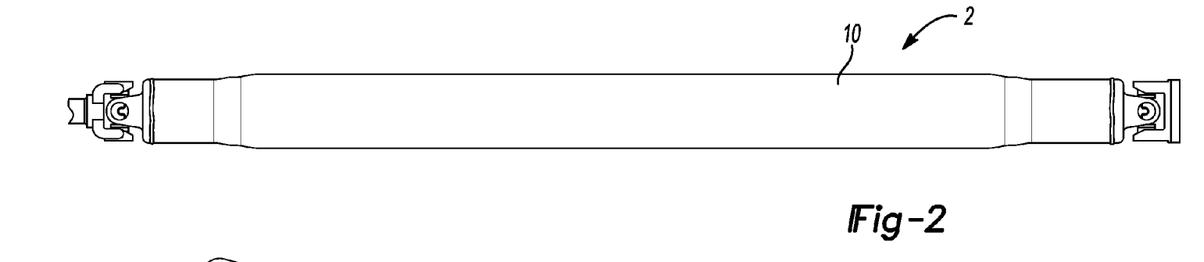
FIG. 2 illustrates a drive shaft incorporating the principles of the present teachings.
Figure 3:
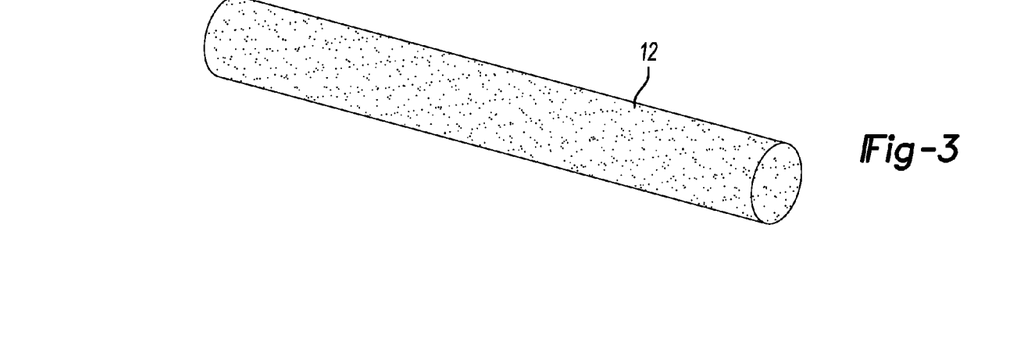
FIG. 3 illustrates a foam liner member according to some embodiments of the present teachings.

With particular reference to FIGS. 1-3, a propeller shaft assembly 2 is illustrated having a propeller shaft member 10 and a viscoelastic, soy-based foam liner 12 according to some embodiments of the present teachings disposed therein. Propeller shaft 10 can be a tubular member having a generally cylindrical shape and a hollow interior volume 14. It should be appreciated that propeller shaft 10 can define any cross-sectional shape conducive to a particular application, such as square, rectangular, octagonal, or any other shape operable for rotation. Moreover, it should be appreciated that propeller shaft 10 can be used for any rotational application, such as a driveshaft for an automotive vehicle, a propeller shaft for a marine application, a propeller shaft for an aeronautical application, a transmission shaft for an industrial application, or any other rotating shaft used to transmit a torque. In the interest of brevity, the present disclosure will focus on the use of the invention in connection with a cylindrical automotive drive shaft, which will be generally indicated as 10, having opposing ends operably coupled to adjacent drive members. The opposing ends of the drive shaft can be coupled using conventional universal joint members. However, description of this particular embodiment should not be regarded as limiting the present application, unless specifically stated or claimed.

In some embodiments, cylindrical propeller shaft 10 can comprise a generally uniform sidewall 16 extending the length thereof having a generally constant outer diameter, inner diameter, and corresponding wall thickness. However, it should be understood that propeller shafts having non-uniform or varying diameter and/or wall thicknesses are anticipated as being part of the present teachings (as illustrated in FIG. 2). Propeller shaft 10 can be made of a conventional material, such as steel, aluminum, and/or other metal, metal alloy, or suitable material. It should also be understood that in some embodiments, propeller shaft 10 can be made of a composite material or plastic material as may be necessary for a particular application.

In some embodiments, viscoelastic, soy-based foam liner 12 is disposed through at least a longitudinal portion of volume 14 of propeller shaft 10 to fill at least a cross-sectional portion of volume 14 of propeller shaft 10. In some embodiments, viscoelastic, soy-based foam liner 12 substantially fills volume 14 of propeller shaft 10 in both a longitudinal direction and a cross-sectional direction. In some embodiments, viscoelastic, soy-based foam liner 12 completely fills volume 14 of propeller shaft 10 in both the longitudinal and cross-sectional directions. In some embodiments, liner 12 can be inflexible.

Figure 4:
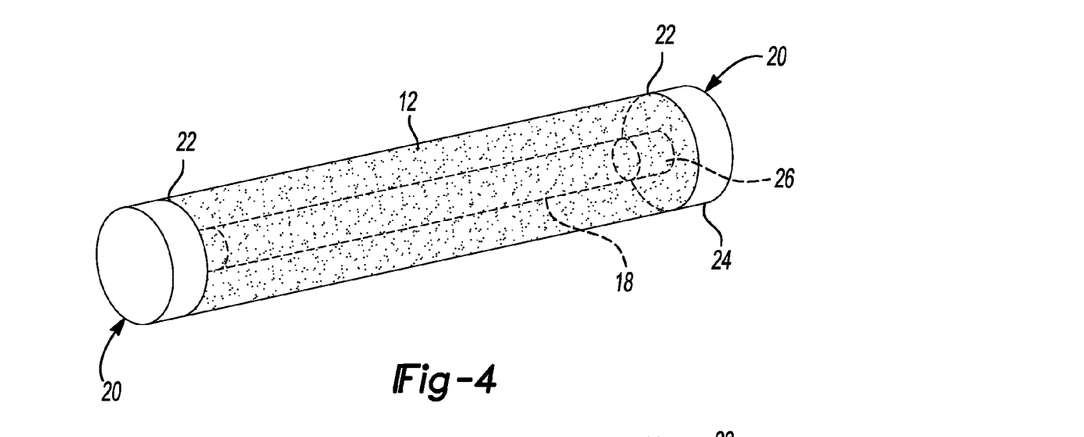
FIG. 4 is a schematic perspective view illustrating a foam liner member having a longitudinally-extending hollow volume contained therein according to the principles of the present teachings.

In some embodiments, as illustrated in FIG. 4, viscoelastic, soy-based foam liner 12 can comprise a generally cylindrical cross-section having a longitudinally-extending bore or hollow volume 18. Hollow volume 18 can extend along the longitudinal axis of viscoelastic, soy-based foam liner 12. This configuration may provide the benefit of reduced weight without substantially sacrificing performance capabilities relating to noise, vibration, and harshness damping. In this embodiment, optional end caps 20 can be formed on opposing ends 22 of viscoelastic, soy-based foam liner 12. End caps 20 can define a first portion 24 having an outer size and shape generally equal to an outer size and shape of viscoelastic, soy-based foam liner 12. End caps 20 can further define a second portion 26 extending from first portion 24 and integrally formed therewith having an outer size and shape generally equal to an inner size and shape of volume 18 of viscoelastic, soy-based foam liner 12 to permit second portion 26 to be received therein. It should also be noted that liner 12 being formed with hollow volume 18 can be achieved using liners made of any one of a number of materials—that is, the principles of the liner having a longitudinally extending hollow volume should not be regarded as being limited to applications employing a viscoelastic, soy-based foam liner.

Figure 5:
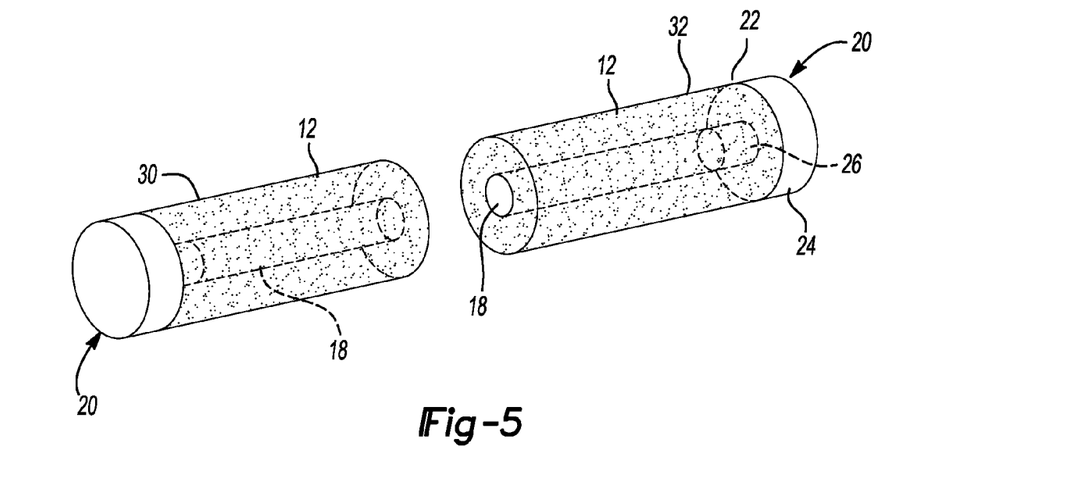
FIG. 5 is a schematic perspective view illustrating a foam liner member having discrete sections according to the principles of the present teachings.

It should be understood that in some embodiments viscoelastic, soy-based foam liner 12 can be formed in two or more separate, discrete sections 30, 32 (FIG. 5). Discrete sections 30, 32 can be separated along a plane or other surface in a direction generally orthogonal to the longitudinal axis of viscoelastic, soy-based foam liner 12. In this way, discrete sections 30, 32 can be positioned within volume 14 of propeller shaft 10. It has been found that this configuration can provide the benefit of reduced weight without substantially sacrificing performance capabilities relating to noise, vibration, and harshness damping. It should be noted that the number of discrete sections shall not be construed as being limited. It should also be noted that liner 12 being formed as discrete sections 30, 32 can be achieved using liners made of any one of a number of materials—that is, the principles of the discrete sections 30, 32 should not be regarded as being limited to applications employing a viscoelastic, soy-based foam liner.

Viscoelastic, soy-based foam liner 12 can be constructed as a longitudinal member having a cross-sectional shape that is different than a final cross-sectional shape for use in propeller shaft 10. Specifically, in some embodiments, viscoelastic, soy-based foam liner 12 can be constructed from a foam material as an elongated member having a square or rectangular or arbitrary cross-section. In this regard, the square or rectangular cross-section can be modified, such as on a lathe, a CNC machine, by hot wire, by skiving, or through the insertion of foam liner 12 into propeller shaft 10, into a final cross-section that closely conforms to the internal shape of propeller shaft 10. In some embodiments, foam liner 12 is modified from a rectangular cross-section to a circular cross-section to define an outside diameter that is greater than the inner diameter of volume 14 of propeller shaft 10 to permit a press-fit to be achieved upon insertion of foam liner 12 into volume 14 of propeller shaft 10. This press-fit permits foam liner 12 to be retained within propeller shaft 10 for rotation therewith during operation and when exposed to application of torque, temperature, humidity, and the like.

In some embodiments, foam liner 12 can be created from its constituent chemicals in liquid form by inserting the constituent chemicals into propeller shaft 10. The liquid chemicals expand and solidify to define a solid (i.e. non-liquid) state foam. In some applications, this liquid can be deposited within propeller shaft 10 without pre-treating the inside of propeller shaft 10 to prevent adhesion. However, in some applications, propeller shaft 10 can be pre-treated with a release agent or other material to prevent or at least inhibit adhesion of foam liner 12 to the inner surface of propeller shaft 10.

In some embodiments, viscoelastic, soy-based foam liner 12 is made of a foam material that is derived from a blend of petroleum-based polyether polyol and a soy-based polyol prepared by the oxidation of RBD grade soybean oil with a peroxy carboxylic acid. It should be understood that RBD grade oil is not required in all embodiments and lesser grade oil can be used. In some embodiments, viscoelastic, soy-based foam liner 12 can be described in relation to its physical and mechanical properties, and relative to those of liners made from other materials, as summarized in Table 1 below:

TABLE 1

Physical and Mechanical Properties

| | Foam Identification | Description | Density [kg/m$^3$] | Air Flow [cfm] | Resilience Ball Rebound [%] | Young's Modulus [kPa] | Damping Ratio [%] |
|---|---|---|---|---|---|---|---|
| Non-soy | FFNVH | Traditional driveshaft foam | 25 | 2.10 | 38 | 60 | 5.6 |
| | FF501 | Conventional, non-soy foam | 23 | 5.00 | 36 | 50 | 4.0 |
| Soy | FF502 | Conventional, soy-based foam 30 php Agrol 3.6 | 25 | 1.75 | 21 | 90 | 6.5 |
| | FF503 | Conventional, soy-based foam 30 php Agrol 3.6 | 21 | 2.00 | 22 | 80 | 6.4 |
| | FF504 | Conventional, soy-based foam 50 php Agrol 3.6 | 22 | 1.00 | 15 | 80 | 7.9 |
| Visco-elastic Soy | FF505 | Viscoelastic, soy-based foam 30 php Agrol 5.6 | 44 | 0.20 | 7 | 90 | 24.0 |

Table 1 illustrates measured physical characteristics of various types of foam. In connection with the tabled columns, air flow provides a sense of the porosity of the foam. The greater the air flow, the greater the porosity. The viscoelastic foam liner 12 has much lower porosity than the other foams. It should be noted that the stated parts per hundred of polyol (php) is a percentage of soy in the polyol blend rather than in the foam.

Similarly, resilience is a measure of how readily the foam recovers its initial shape after deformation. Here, resilience was measured using a ball rebound test which can be correlated to resilience. The viscoelastic foam liner 12 has very low resilience compared to the other foams meaning it recovers more slowly from deformation.

ing a 1,000 molecular weight, petroleum-based polyether polyol and a soy-based polyol prepared by the oxidation of RBD grade or lesser grade soybean oil with a peroxy carboxylic acid. For additional detail relating to the present process, attention is directed to U.S. Pat. No. 7,893,287 which is incorporated herein by reference.

Figure 7:
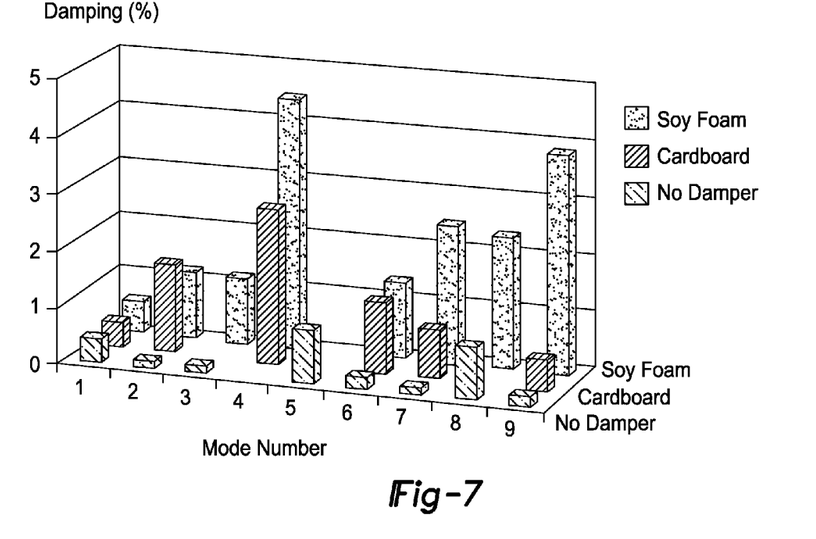
FIG. 7 is a graph illustrating damping values of propeller shafts at various modes for an undamped configuration, a cardboard liner damped configuration, and a foam liner configuration according to the present teachings.

For a discussion of natural frequency and associated damping values for a propeller shaft having no damper (a), a conventional cardboard damper (b), and a soy-based foam damper (c), attention should be directed to Table 2 below and FIG. 7.

TABLE 2

Natural frequency and damping values

| Mode Number (Mode Type) | Modal property | (a) No Damper | (b) Cardboard | (c) Soy Foam | Soy Foam vs. Cardboard |
|---|---|---|---|---|---|
| 1 (Hybrid) | Frequency (Hz) | 126 | 120 | 121 | |
| | Damping (%) | 0.40 | 0.41 | 0.54 | +32% |
| 2 (Shell) | Frequency (Hz) | 374 | 336 | 372 | |
| | Damping (%) | 0.09 | 1.57 | 1.17 | −25% |
| 3 (Shell) | Frequency (Hz) | 426 | | 420 | |
| | Damping (%) | 0.11 | | 1.15 | |
| 4 (Hybrid) | Frequency (Hz) | | 470 | 458 | |
| | Damping (%) | | 2.70 | 4.43 | +64% |
| 5 (Bending) | Frequency (Hz) | 480 | | | |
| | Damping (%) | 0.93 | | | |
| 6 (Shell) | Frequency (Hz) | 550 | 564 | 539 | |
| | Damping (%) | 0.20 | 1.25 | 1.32 | +6% |
| 7 (Shell) | Frequency (Hz) | 767 | 764 | 748 | |
| | Damping (%) | 0.11 | 0.87 | 2.44 | +180% |
| 8 (Bending) | Frequency (Hz) | 910 | | 913 | |
| | Damping (%) | 0.93 | | 2.35 | |
| 9 (Shell) | Frequency (Hz) | 1030 | 1020 | 1009 | |
| | Damping (%) | 0.15 | 0.53 | 3.86 | +628% |

Young's modulus is the elastic stiffness of the foams. It is a measure of how much the foams will structurally bend or elongate due to, respectively, a specific bending moment or a specific axial force. The viscoelastic foam liner 12 was found to have similar stiffness compared to the other, and this value is suitably low for the propeller shaft application. It is generally desirable to limit the amount of stiffness exerted by viscoelastic foam liner 12 to propeller shaft 10 in which it is contained.

Damping ratio is the most important property for this application. It is a measure of how readily the material dissipates energy during vibration. The viscoelastic foam liner 12 of the present teachings has significantly higher damping than the others, so if the foams are subjected to the same vibration, the amplitude of the vibration will dissipate most rapidly in the viscoelastic foam liner 12. Also, this property is generally able to reduce vibration of other components which are in contact with, or connected to, viscoelastic foam liner 12. The ability of viscoelastic foam liner 12 to damp vibrations in connected components is also affected by the nature of the connection, friction, the other material, etc. But generally speaking, higher damping is desired. Since, by virtue of its high damping, the viscoelastic foam liner readily reduces the vibration of other connected or in-contact components, it will also readily inhibit the emanation of sound energy from those components. Furthermore, the viscoelastic foam liner will be effective at dissipating sound energy passing into it from nearby components, or components to which it is indirectly connected though the propeller shaft in which it lies, such as a motor vehicle engine or transmission.

Figure 6A:
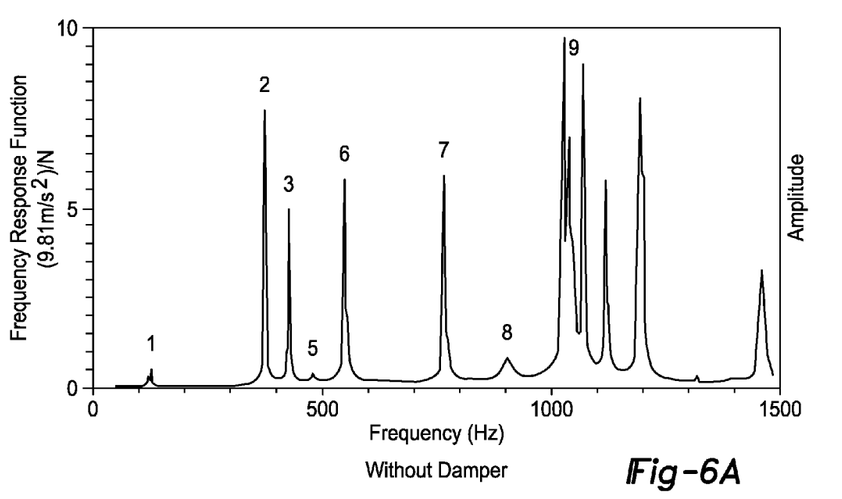
FIGS. 6A-6C is a series of frequency response function (FRF) graphs for freely supported shafts illustrating frequency response functions, averaged over all measured points on each shaft, relative to frequency for an undamped configuration (6A), a cardboard liner damped configuration (6B), and a soy-foam liner configuration according to the present teachings (6C)
Figure 6B:
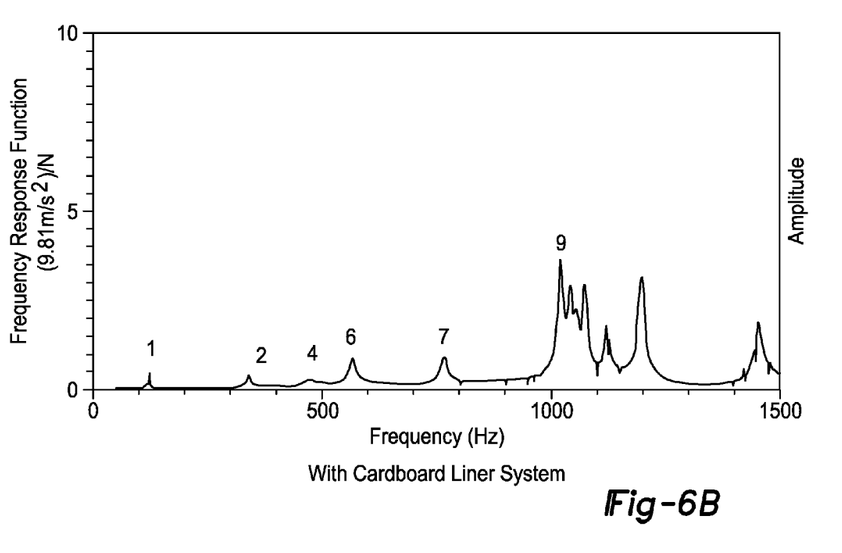
Figure 6C:
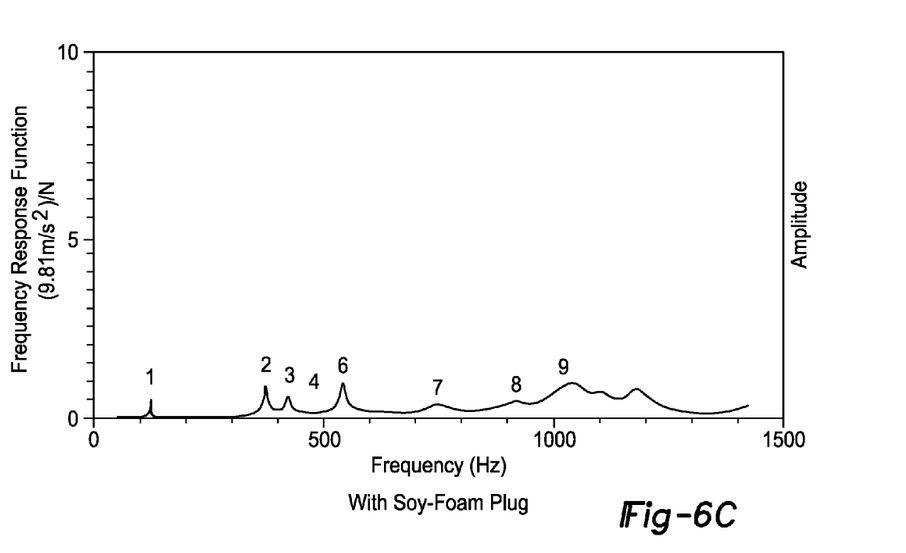
Figure 8A:
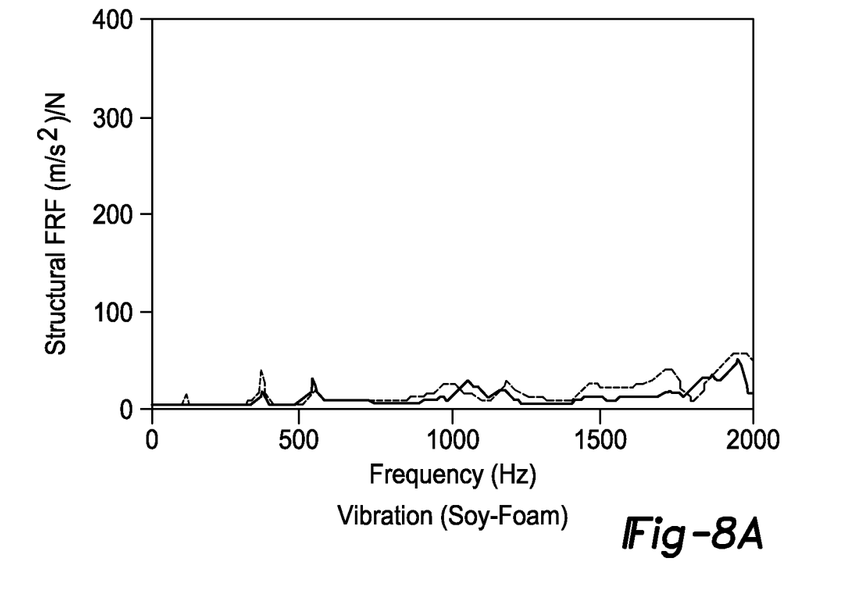
FIGS. 8A-8D is a series of structural frequency response functions (FRF) for shafts having pin supports at each end relative to frequency for a cardboard liner damped configuration (8B & 8D) and a foam liner configuration according to the present teachings (8A & 8C). The two curves in each of 8A and 8B are the FRFs at two specific points on each shaft.
Figure 8B:
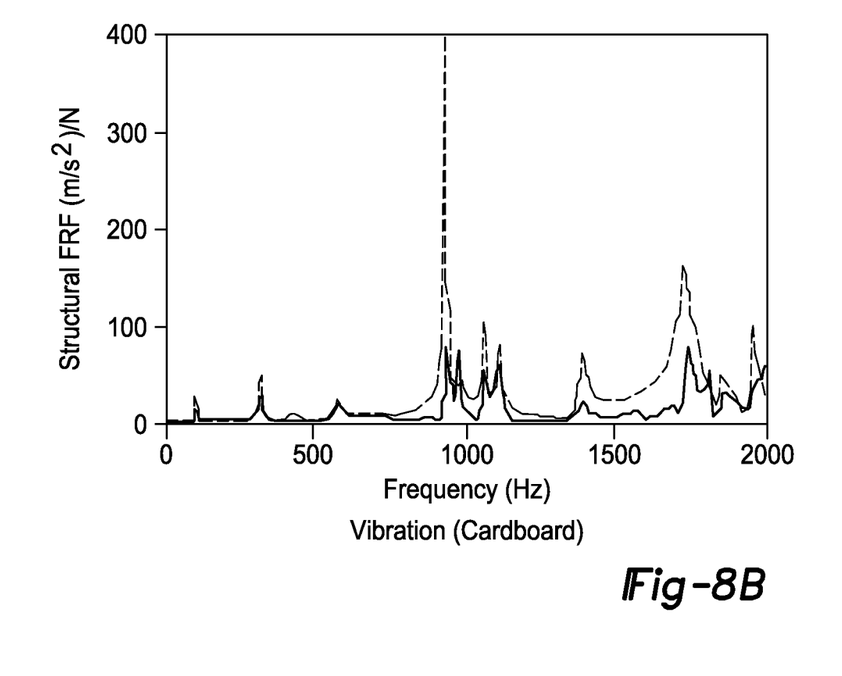
Figure 8C:
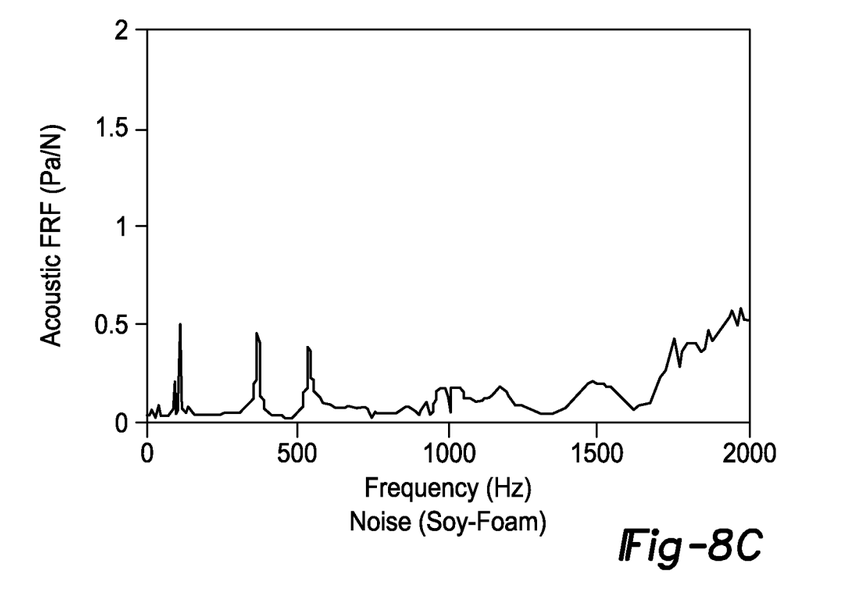
Figure 8D:
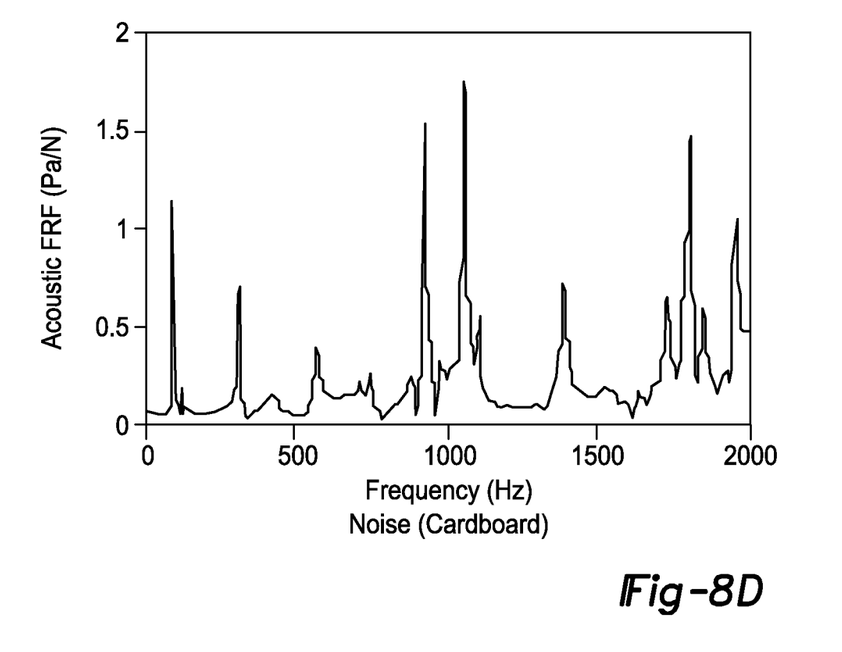

In some embodiments, viscoelastic foam liner 12 can comprise a formulation with TDI isocyanate and a blend compris- With particular reference to FIGS. 6A-6C, frequency response functions of propeller shaft 10 having universal joints in a free-free support condition are presented, specifically FIG. 6A presents frequency response functions for a shaft having no damper, FIG. 6B presents frequency response functions for a shaft having a conventional cardboard liner damper, and FIG. 6C presents frequency response functions for a shaft having viscoelastic foam liner 12. It can be seen by the presence of frequency spikes that through the use of viscoelastic foam liner 12 (FIG. 6C), there is a reduction of these peak values of most of the spikes, indicating increased damping, relative to a dampener-less condition or a cardboard liner condition. For additional specifics, attention should be directed to FIGS. 8A-8D illustrating vibration and noise levels of a propeller shaft with viscoelastic, soy-based foam liner 12 (FIGS. 8A & 8C) versus conventional cardboard liners (FIGS. 8B & 8D).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A propeller shaft assembly comprising:
    a propeller shaft member having an inner volume; and
    a foam liner member disposed in at least a portion of the inner volume of the propeller shaft member, the foam liner member being made of a viscoelastic, natural oil polyol-based foam, the foam liner member being operable to reduce vibration amplitudes occurring within the propeller shaft member relative to an undampened propeller shaft member.

2. The propeller shaft assembly according to claim 1 wherein the foam liner member is made of a low-molecular weight, viscoelastic, soy-based foam.

3. The propeller shaft assembly according to claim 1 wherein the foam liner member is made of a viscoelastic, vegetable oil-based foam.

4. The propeller shaft assembly according to claim 1 wherein the foam liner member is made of a viscoelastic, palm oil-based foam.

5. The propeller shaft assembly according to claim 1 wherein the foam liner member comprises a solid cylindrical member extending along a substantial portion of the inner volume of the propeller shaft.

6. The propeller shaft assembly according to claim 1 wherein the foam liner member comprises a plurality of discrete members extending along a portion of the inner volume of the propeller shaft.

7. The propeller shaft assembly according to claim 1 wherein the foam liner member comprises a generally hollow volume extending along at least a portion of the longitudinal axis of the foam liner member.

8. The propeller shaft assembly according to claim 7, further comprising:
an end cap being coupled to an end of the foam liner member, the end cap having a first portion being sized and shaped to closely conform to an outer diameter of the foam liner member and a second portion being sized and shaped to closely conform to an inner diameter of the generally hollow volume, the first portion and the second portion being integrally formed together.

9. The propeller shaft assembly according to claim 7, further comprising:
an end cap being coupled to an end of the foam liner member, the end cap having a portion being sized and shaped to closely conform to an outer diameter of the foam liner member.

10. The propeller shaft assembly according to claim 1 wherein the foam liner member is sized and shaped to define an outer dimension that is greater than an inner dimension of the inner volume of the propeller shaft.

11. The propeller shaft assembly according to claim 1 wherein the foam liner member is sized and shaped to define an outer dimension that is greater than an inner dimension of the inner volume of the propeller shaft to define a press-fit connection.

12. The propeller shaft assembly according to claim 1, further comprising:
a release agent disposed along at least a portion of the inner volume of the propeller shaft to inhibit adhesion of the foam liner member thereto.

13. The propeller shaft assembly according to claim 1 wherein the propeller shaft member comprises opposing longitudinal ends and the foam liner member is a continuous member substantially filling the inner volume of the propeller shaft member and extending between the opposing longitudinal ends.

14. The propeller shaft assembly according to claim 1 wherein the foam liner is initially disposed in the inner volume of the propeller shaft member in a liquid form and expands to a solid form while in the inner volume of the propeller shaft member.

* * * * *